United States Patent
Friestad et al.

(10) Patent No.: US 10,960,332 B2
(45) Date of Patent: Mar. 30, 2021

(54) HIGH PRESSURE WATER EXTRACTION DEVICE WITH SHAVE OFF EDGE THAT FEEDS A LOW PRESSURE CHAMBER AND INTERNAL HELIX FEATURE TO IMPROVE WATER COLLECTION AND DRAINAGE

(71) Applicant: HONEYWELL INTERNATIONAL INC., Morris Plains, NJ (US)

(72) Inventors: Ron Friestad, LaVerne, CA (US); Mark Fewell, Riverside, CA (US); Mike Faust, Redondo Beach, CA (US); Juan Sosa, Mexicali (MX)

(73) Assignee: Honeywell International Inc., Charlotte, NC (US)

( * ) Notice: Subject to any disclaimer, the term of this patent is extended or adjusted under 35 U.S.C. 154(b) by 298 days.

(21) Appl. No.: 15/728,316

(22) Filed: Oct. 9, 2017

(65) Prior Publication Data

US 2019/0105590 A1    Apr. 11, 2019

(51) Int. Cl.
*B01D 45/04*      (2006.01)
*F24F 3/153*      (2006.01)
(Continued)

(52) U.S. Cl.
CPC ........... *B01D 45/04* (2013.01); *B01D 53/265* (2013.01); *B64D 13/06* (2013.01); *F24F 3/153* (2013.01); *F24F 5/0007* (2013.01); *F24F 12/006* (2013.01); *B01D 45/08* (2013.01); *B01D 2259/4575* (2013.01); *B64D 2013/0662* (2013.01); *F24F 5/0003* (2013.01); *F24F 5/0085* (2013.01); *F24F 2003/1446* (2013.01);
(Continued)

(58) Field of Classification Search
CPC ........ B01D 45/04; B01D 45/16; B01D 45/08; B01D 45/12; B01D 29/58; B01D 53/265; B01D 2259/45; B01D 2259/4575; F24F 3/153; F24F 5/0007; F24F 5/0003; F24F 5/0085; F24F 12/006; F24F 2003/1446; B64D 13/06; B64D 13/00; B64D 2013/0662; F28F 9/0268; F28F 17/005; F28B 1/00
See application file for complete search history.

(56) References Cited

U.S. PATENT DOCUMENTS 1,678,844 A * 7/1928 Bradshaw .............. B01D 45/08
                                                    55/444
4,802,901 A    2/1989 Wurz
(Continued)

FOREIGN PATENT DOCUMENTS

EP         0330704 B1      4/1993
JP    2000249007 A *  9/2000    ........... F02M 35/022

OTHER PUBLICATIONS

Machine translation of JP 2000-249007 (Year: 2000).*

(Continued)

*Primary Examiner* — Joseph F Trpisovsky
(74) *Attorney, Agent, or Firm* — Shumaker & Sieffert, P.A.

(57) ABSTRACT

A water extractor includes a plurality of layers of low pressure zones and a plurality of channels of high pressure zones. The low pressure zone layers alternate, in a radial direction, with the high pressure zone channels. At least one of the low pressure zones is configured to enable a flow to enter, from at least one high pressure zone, to at least one low pressure zone.

20 Claims, 8 Drawing Sheets

(51) Int. Cl.
  F24F 12/00 (2006.01)
  B01D 53/26 (2006.01)
  B64D 13/06 (2006.01)
  F24F 5/00 (2006.01)
  *F24F 3/14* (2006.01)
  *F28B 1/00* (2006.01)
  *F28F 9/02* (2006.01)
  *F28F 17/00* (2006.01)
  *B01D 45/08* (2006.01)

(52) U.S. Cl.
  CPC ............... *F28B 1/00* (2013.01); *F28F 9/0268* (2013.01); *F28F 17/005* (2013.01)

(56) References Cited

U.S. PATENT DOCUMENTS

| | | | | |
|---|---|---|---|---|
| 6,810,835 | B2* | 11/2004 | Ishiguro | B01D 53/26 122/34 |
| 2007/0125051 | A1* | 6/2007 | Faust | B01D 45/16 55/447 |
| 2010/0326026 | A1 | 12/2010 | Bratton | |
| 2014/0007774 | A1 | 1/2014 | Bonati et al. | |
| 2017/0045243 | A1* | 2/2017 | Zazueta | F24F 3/1405 |

OTHER PUBLICATIONS

EP search report in application No. 18199194.4-1008 dated Feb. 13, 2019.

Response to Extended Search Report dated Feb. 13, 2019, from counterpart European Application No. 18199194.4, filed Aug. 1, 2019, 15 pp.

Notice of Intent to Grant and Text Intended to Grant from counterpart European Application No. 18199194.4, dated Nov. 19, 2019, 29 pp.

Extended Search Report from counterpart European Application No. 20162227.1, dated Jul. 6, 2020, 7 pp.

Response to Extended European Search Report dated Jul. 6, 2020, from counterpart European Application No. 20162227.1, filed Jan. 15, 2021, 14 pp.

* cited by examiner

US 10,960,332 B2

HIGH PRESSURE WATER EXTRACTION DEVICE WITH SHAVE OFF EDGE THAT FEEDS A LOW PRESSURE CHAMBER AND INTERNAL HELIX FEATURE TO IMPROVE WATER COLLECTION AND DRAINAGE

BACKGROUND OF THE INVENTION

The present invention generally relates to apparatus and methods for the treatment of airstreams in an environmental control system (ECS) and, more particularly, to remove humidity from airstreams using an integrated heat exchanger system having a water extraction device.

In an aircraft environmental control system, humidity must be removed from the air prior to delivery to the pressurized cabin or equipment/electronics. The humidity can be removed by cooling the air below the water saturation temperature in reheater and condenser heat exchangers thus condensing most of the water vapor in the air into droplets. The droplets must then be separated from the air before the air is recuperatively heated in the reheater, and expanded and cooled in the cooling turbine.

Past high pressure water extraction loop designs include a condenser, a reheater, and a water extractor. However, the designs can be large, heavy, have many parts and components, and typically provide an installation challenge in many ECS applications. It is difficult to package the length required for current water extractor designs.

As can be seen, there is a need for an improved heat exchanger system that includes water extraction.

SUMMARY OF THE INVENTION

In one aspect of the present invention, a heat exchange system comprises a reheater; a condenser that is downstream of and directly interfaces the reheater; a first water extractor that is downstream of and directly interfaces the condenser, wherein the first water extractor includes: a group of low pressure chambers; wherein at least one channel is configured to promote a high pressure flow to enter at least one chamber; and a second water extractor that is downstream of and directly interfaces the condenser, and is upstream of and directly interfaces the reheater.

In another aspect of the present invention, a water extractor comprises a plurality of layers of low pressure zones; a plurality of channels of high pressure zones; wherein the low pressure zone layers alternate, in a radial direction, with the high pressure zone channels; and wherein at least one of the low pressure zones is configured to enable air/water flow to enter, from at least one high pressure zone, to at least one low pressure zone.

In yet another aspect of the present invention, a water extractor a plurality of layers of chamber inlets; a plurality of channels of flow paths; wherein the chamber inlet layers alternate, in a radial direction, with the flow path channels; and wherein at least one of the chamber inlets is configured to promote a flow to enter, from at least one flow path, to at least one chamber inlet, These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

As used herein, the term "air" is intended to encompass the broader term "fluid". Thus, the term "air" and "fluid" are intended to be interchangeable.

The present invention generally provides an integrated heat exchange system whereby a core of cross-flow heat exchange passages are shared by a reheater and a condenser. A first water extractor is directly downstream of a first pass of the condenser and directly interfaces the condenser so that fluid lines are eliminated between the condenser and the first water extractor. The first water extractor extracts humidity in the fluid (i.e., air) from the condenser. Concurrently, the first water extractor turns the humidified fluid back towards and into a second pass of the condenser. A second water extractor is directly downstream of the condenser and further extracts humidity in the fluid from the condenser. The second water extractor turns the further dehumidified fluid towards and into the reheater.

As a result of the integration of the components herein, space requirements for a heat exchange system can be reduced by about 30% to about 50% of the volume of space otherwise required by past heat exchange system designs. The number of parts is reduced by about 40% to about 70%. The number of connections is reduced by about 25% to about 50%.

Figure 1A:
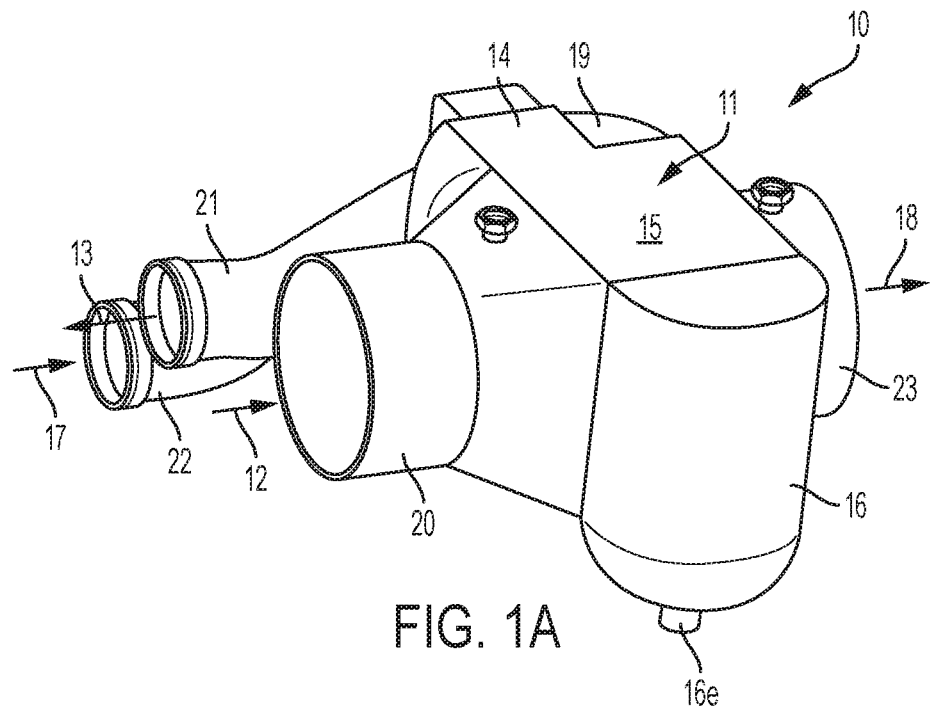
FIG. 1A is a perspective view of a heat exchange system according to an exemplary embodiment of the present invention.
Figure 1B:
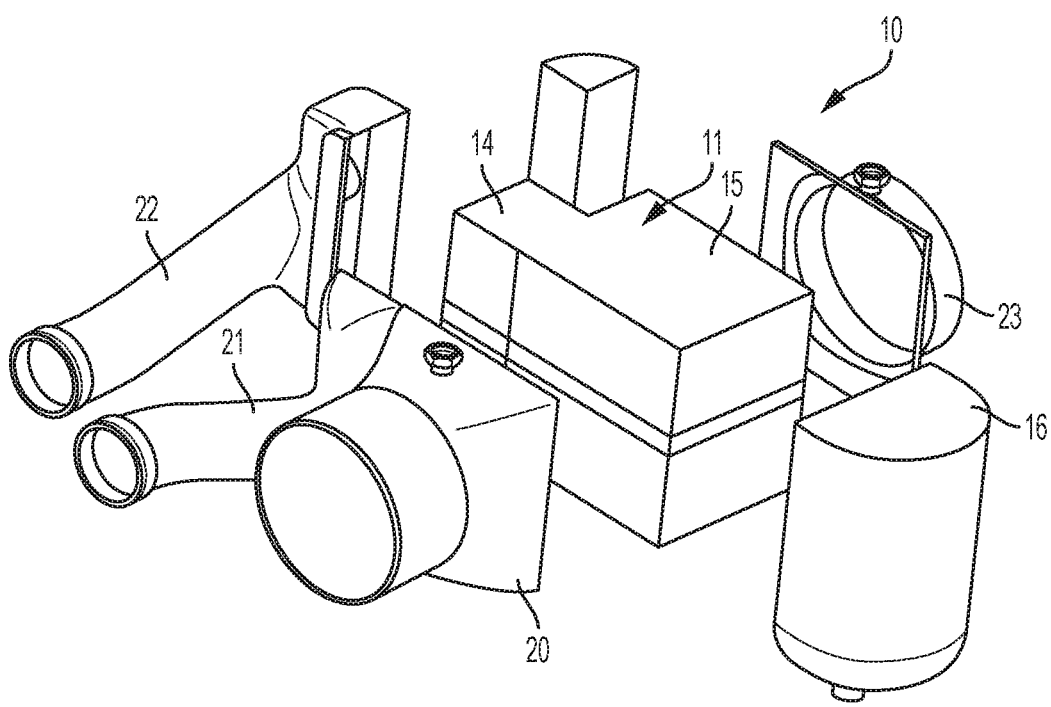
FIG. 1B is an exploded view of FIG. 1A.

In FIGS. 1A-1B, a heat exchange system 10 is shown according to an exemplary embodiment of the present invention. The system 10 may include a core 11 (that includes a reheater 14 and a condenser 15), a first water extractor 16, and a second water extractor 19.

The core 11 may include cross flow heat exchange passages. The core 11 can include common fins, bars, tube sheets and separator plates as known in the art.

Figure 2:
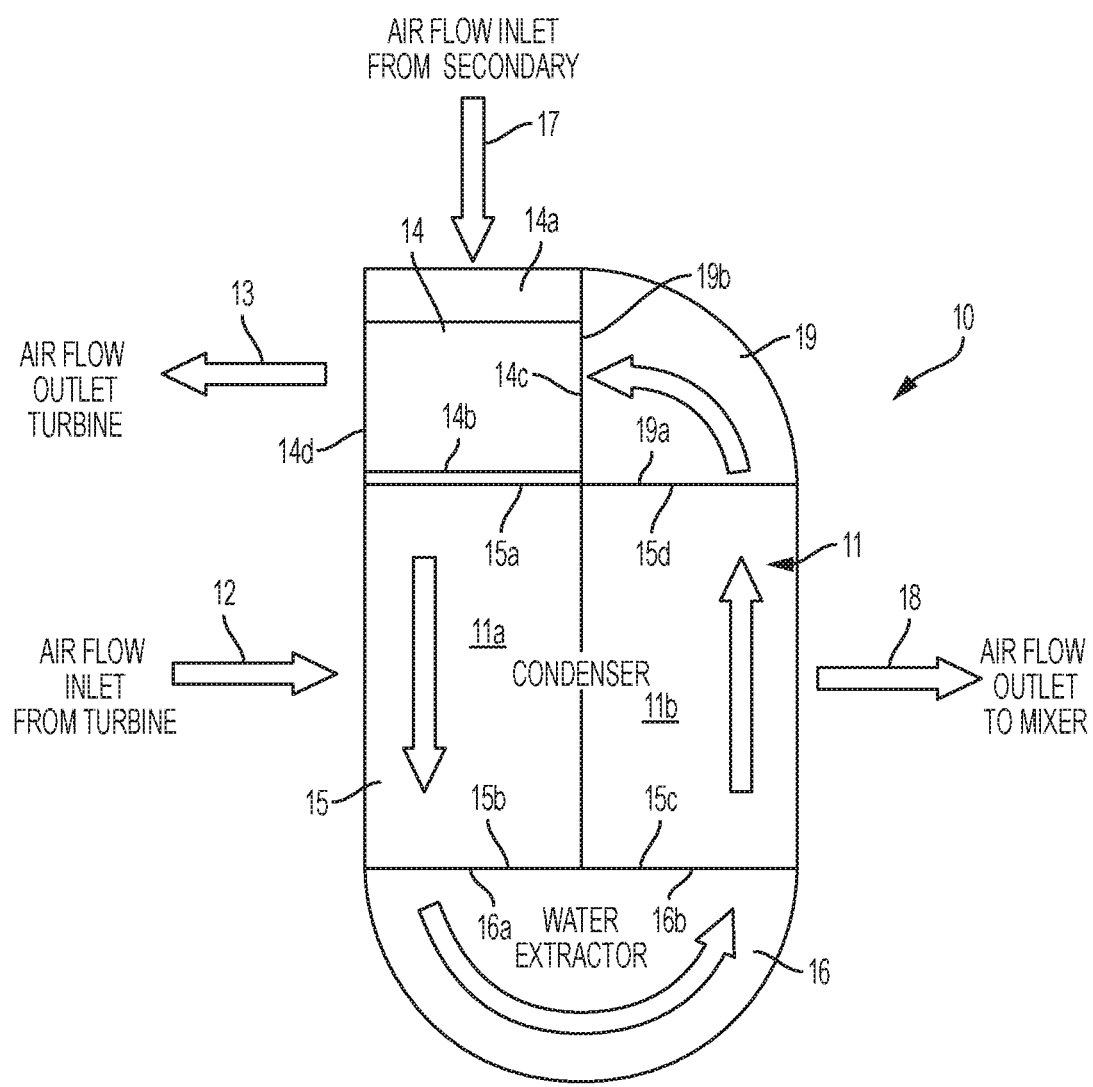
FIG. 2 is a schematic view of the heat exchange system of FIGS. 1A-1B.

In FIG. 2, the core 11 may include a shared portion 11a and a non-shared portion 11b, in an exemplary embodiment. For example, the shared portion 11a may be a portion of the core 11 wherein different components (or parts thereof) of the heat exchange system 10 may share common heat exchange passages. In the non-shared portion 11b, different components of the heat exchange system 10 may not share common heat exchange passages.

In an embodiment, the shared portion 11a may include the reheater 14 and the condenser 15, each of which are in defined portions of the core 11 but share some of the same heat exchange passages. In other words, one or more heat exchange passages may extend through the reheater 14 and the condenser 15, wherein each of the passages may have two operational segments (though not physically segmented). One operational segment may function as part of a reheater and another operational segment may function as part of a condenser.

As shown in FIG. 2, the reheater 14 can operate on a cross flow of air (i.e., fluids) in heat exchange passages, as in known in the art. The reheater 14 may include a humidified air inlet face 14a, a humidified air outlet face 14b, a dehumidified air inlet face 14c, and a dehumidified air outlet face 14d. Each of the foregoing faces may generally represent a plane or planar area that may define one or more of the boundaries or perimeters of the reheater 14.

The humidified air inlet face 14a may connect to an air inlet or manifold 22 which may receive a humidified inlet air 17, such as air from a secondary heat exchanger of an aircraft ECS. Upon the humidified air 17 in the reheater 14 undergoing heat exchange, the humidified air outlet face 14b may pass reheater humidified air into the condenser 15.

At the same time, the dehumidified air inlet face 14c of the reheater 14 may receive further dehumidified air from the second water extractor 19 described below. The reheater 14 can heat the dehumidified air and pass it through the dehumidified air outlet face 14d. Heated, dehumidified air 13 may flow into an air outlet or manifold 21, and then to a turbine, for example, of an ECS of an aircraft.

The condenser 15 can operate on a cross flow of fluids in the heat exchange passages as in known in the art. The condenser 15 may be directly downstream of the reheater, and may include a reheater air inlet face 15a, a condensed air outlet face 15b, a dehumidified air inlet face 15c, and a dehumidified air outlet face 15d (FIG. 2). Each of the foregoing faces may generally represent a plane or planar area that may define one or more of the boundaries or perimeters of the condenser 15.

The reheated air inlet face 15a of the condenser 15 may directly interface the humidified air outlet face 14b of the reheater 14. In other words, 15a is directly face-to-face with 14b in the absence of fluid connection lines otherwise used when a reheater and condenser are not integrated as a single component as in past designs. The reheated air inlet face 15a of the condenser 15 may receive humidified air from the reheater 14.

The condenser 15 may condense the humidified air from the reheater 14. This may occur via heat exchange with an inlet air 12, such as from a turbine of an aircraft ECS. The inlet air 12 may pass into an air inlet or manifold 20 that is connected to the condenser 15. Condensed air may then exit from the condenser 15, via the condensed air outlet face 15b.

As mentioned above, the condenser 15 can share heat exchange passages with the reheater 14. As depicted in FIG. 2, the sharing of heat exchange passages, in this exemplary embodiment, is only partial. The heat exchange passages that carry inlet air 17 through the reheater 14 can extend all through the condenser 15 and up to the first water extractor 16 described below. However, the cross flow passages of the condenser 15 that receive the inlet air 12 may not be shared with the reheater 14. Likewise, the condenser 15 passages that receive dehumidified air from the first water extractor 16 may not be not shared with the reheater 14. And the passages in the reheater 14, that receive flow from the second water extractor 19 described below, may not be shared with the condenser 15.

The first water extractor 16, of the heat exchange system 10, may be directly downstream of the condenser 15, and may include a condensed air inlet face 16a and a dehumidified air outlet face 16b (FIG. 2). Each of the foregoing faces may generally represent a plane or planar area that may define the boundaries or perimeters of the water extractor 16.

The condensed air inlet face 16a of the water extractor 16 may directly interface the condensed air outlet face 15b of the condenser 15. In other words, 16a is directly face-to-face with 15b in the absence of fluid connection lines between them. The condensed air inlet face 16a of the water extractor 16 may receive condensed water and air from the condenser 15.

Figure 3:
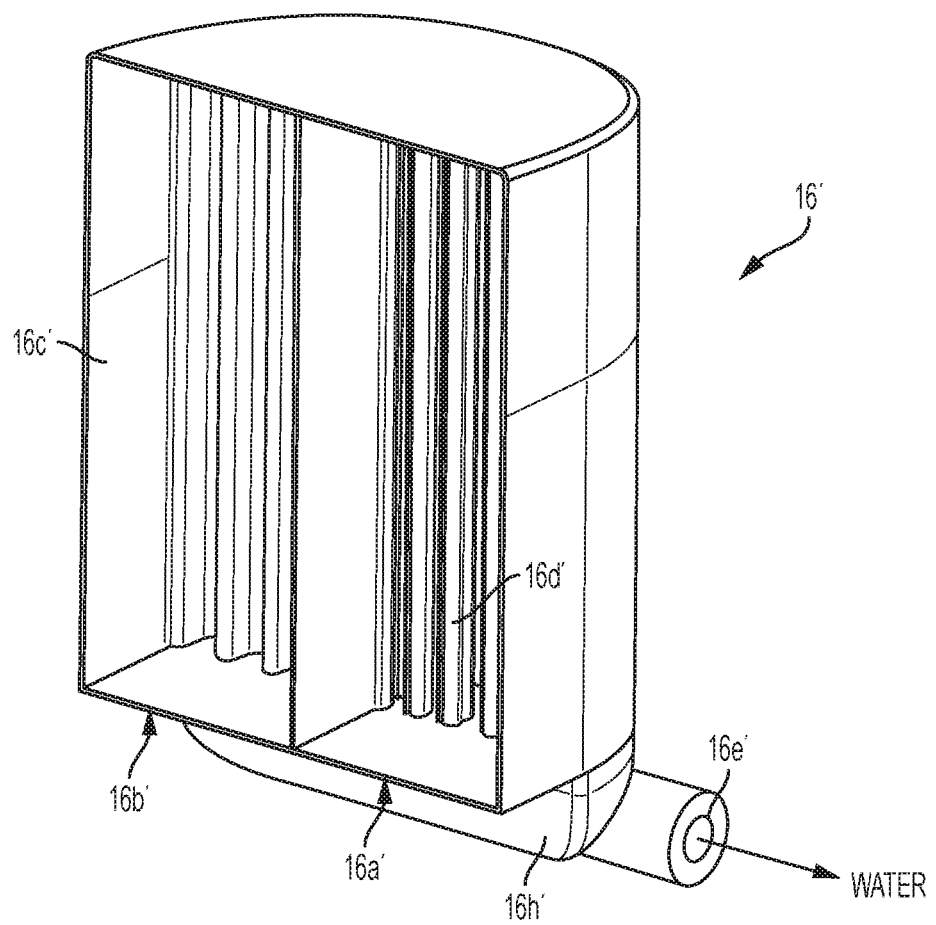
FIG. 3 is a perspective view of a water extractor according to an embodiment of the present invention.

FIG. 3 is a perspective view of another embodiment of a first water extractor 16' which is similar to the water extractor 16 in FIGS. 1A-1B and 2. The first water extractor 16' includes a condensed air inlet face 16a' and a dehumidified air outlet face 16b'. Each of the foregoing faces may generally represent a plane or planar area that may define part of the boundaries or perimeters of the water extractor 16'. The water extractor 16' may further include a first outside wall 16c' that may define a part of the perimeter of the water extractor 16'. One or more first interior walls 16d' may have a curved configuration and/or semi-circular configuration. The first interior walls 16d' may be positioned from or near the inlet face 16a' and to or near the outlet face 16b'. As further described below, a manifold 16h' may collect water and purge the collected water via an outlet 16e'.

Figure 4A:
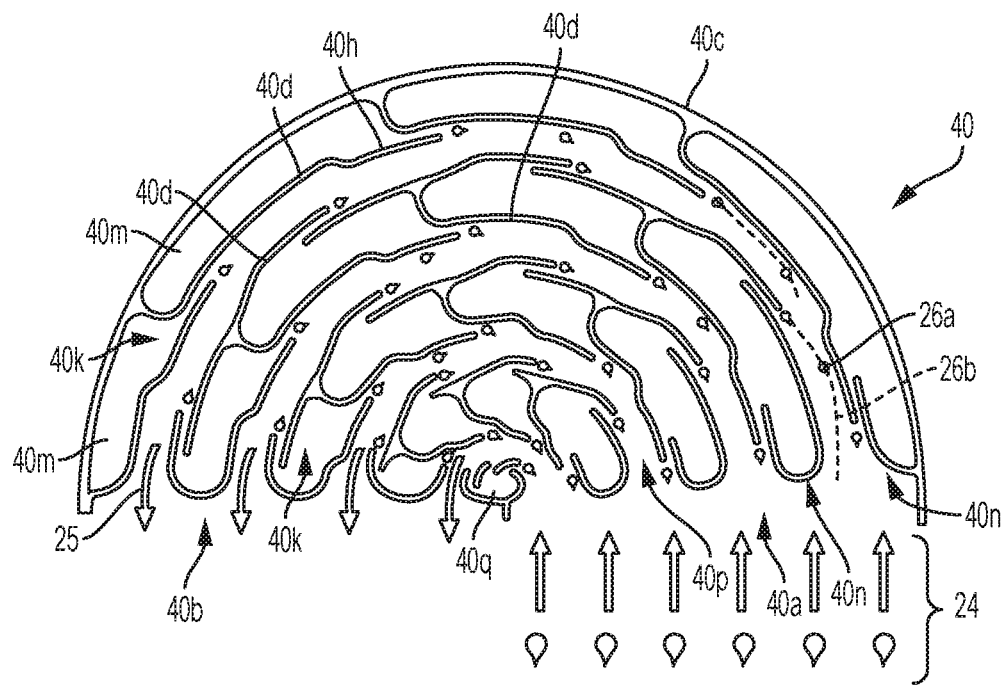
FIG. 4A is a schematic view of a water extractor according to another exemplary embodiment of the present invention.
Figure 4B:
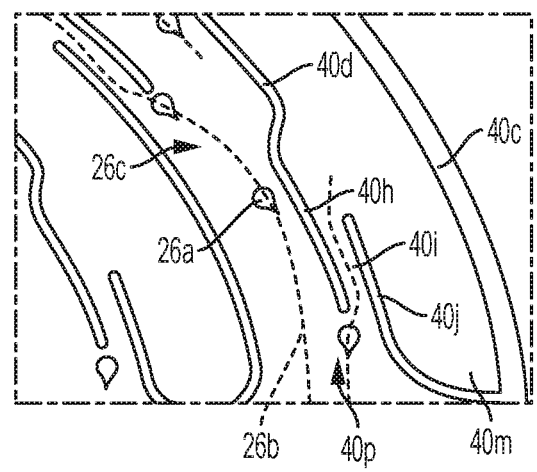
FIG. 4B is an enlarged view of a portion of FIG. 4A.
Figure 4C:
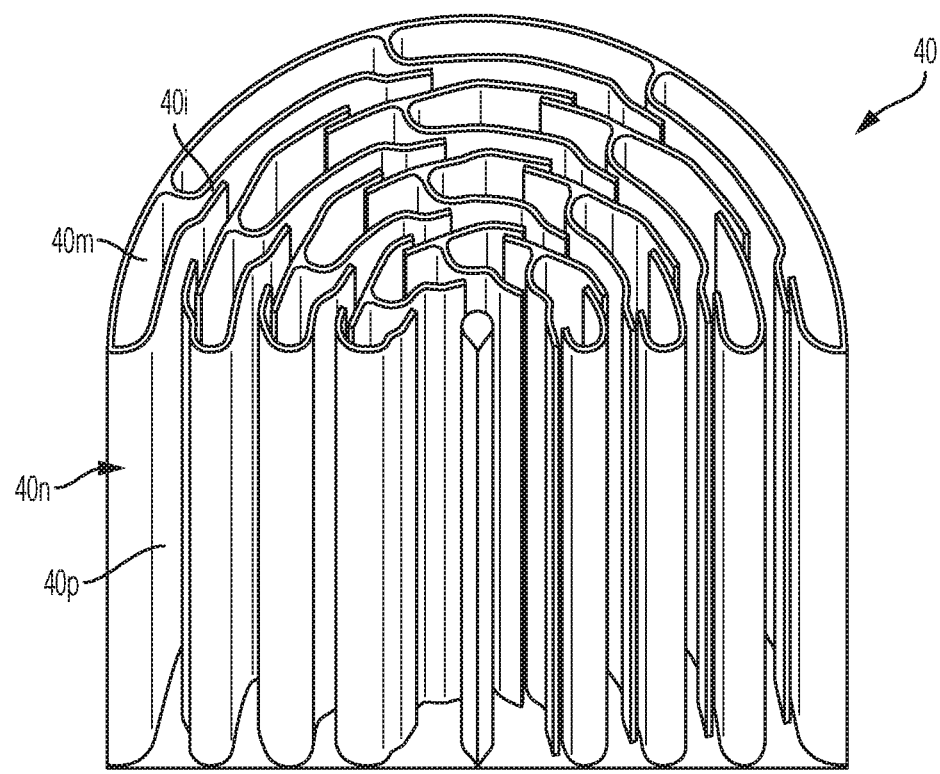
FIG. 4C is a perspective view of the water extractor in FIG. 4A.

FIGS. 4A-4C depict yet another exemplary embodiment of a first water extractor 40. The first water extractor 40 may, upon receiving condensed water and air 24 at an inlet face 40a, turn the condensed water and air 24 around a center area or axis 40q, and exit, as condensed water and air 25, at an outlet face 40b to the condenser 15. In this exemplary embodiment, the condensed water and air 24 may be turned 180°, or substantially about 180°. Concurrently as the condensed water and air 24 is turned, the water extractor 40 can remove condensed water from the air, such as in the form of water droplets 26a, via inertia.

In an exemplary embodiment, the first water extractor 40 may include a first outside wall 40c. The first water extractor 40 may also include a plurality of first interior walls 40d that are radially inward of the first outside wall 40c. The first interior walls 40d may be curved and/or semi-circular, and may be concentric to one another in a radial direction. In various embodiments, the first interior walls 40d may or may not be equally spaced, radially, from one another.

In FIGS. 4A and 4C, the interior walls 40d can be configured to provide one or more chambers (i.e., low pressure zones) 40m. The chambers 40m may all have the same configuration or some/all may differ in configuration from one another.

The chambers 40m may be arranged in one or more groups 40k (i.e., low pressure zones) of chambers 40m. The number of chambers 40m in each chamber group 40k may be the same or some/all may differ from one another.

In embodiments, one or more of the chamber groups 40k may be configured in one or more chamber layers 40n (i.e., low pressure zones) that may be positioned concentric to one another in a radial direction. Each chamber layer 40n may have a curved or semi-circular configuration. However, the chamber layers 40n may or may not have different configurations.

In embodiments, the chambers 40m, in one or more of the chamber groups 40k, may be positioned in an end-to-end relationship. However, the present invention contemplates that the chambers can be positioned in a side-by-side relationship or in other orientations.

In FIGS. 4A and 4B, in embodiments, one or more of the chambers 40m may have an oblong shape and may be configured with a length longer than a width. Some or all of the chambers 40m may have the same or different configurations.

In embodiments, one or more chambers 40m may be configured with a respective chamber inlet 40i (i.e., low pressure zone). Accordingly, the inlets 40i may be arranged in and be part of the chamber layers 40n.

One or more of the chamber inlets 40i can be positioned along a side (or both opposing sides) of a respective flow channel 40p described below, thus providing an inlet layer. In embodiments, the chamber inlets 40i can be equally or unequally spaced from one another along the respective flow channel 40p. Thereby, the chamber inlets 40i can enable and promote the flow of humid air into one or more chambers 40m, as further described below.

The one or more chamber inlets 40i may be parts of one or more interior walls 40d. In embodiments, a respective chamber inlet 40i may be on opposite lateral sides of a single chamber 40m. In embodiments, one or more of the chamber inlets 40i may include two interior wall portions 40h, 40j. The wall portions 40h, 40j may be parallel to one another in certain embodiments.

In embodiments, one or more of the wall portions 40h may have a step configuration. One or more of the wall portions 40h may extend into a respective flow channel 40p. A distal end of the wall portion 40h that is in a flow channel may be described as a "shave off edge."

Still referring to FIGS. 4A and 4B, the humid air 24 can enter the water extractor 40 and travel along one or more flow paths (i.e., high pressure zones) 26b that flow in a direction 26c. One or more flow paths 26b may be in one or more radially positioned flow channels 40p (i.e., high pressure zones). In embodiments, one flow channel 40p includes multiple flow paths 26b. Each flow channel 40p may have a curved or semi-circular configuration, and may be concentric to one another in a radial direction. However, not all of the flow channels 40p may have the same configuration. In embodiments, one flow channel 40p may be positioned to alternate with one chamber layer 40n in a stacked or radially extending configuration.

In one or more of the flow paths (high pressure zones) 26b and/or flow channels 40p (high pressure zones), the humid air may be at a pressure higher than the pressure in one or more of the chambers (low pressure zones) 40m and/or chamber layers 40n (low pressure zones). This pressure differential may be particularly present between a chamber 40m and an immediately adjacent flow path 26b. In other words, the pressure differential may be particularly present between a chamber layer 40n and an immediately adjacent flow channel 40p. The pressure differential may enable and promote the humid air in a flow path 26b to enter one or more of the adjacent chamber inlets 40i.

Figure 5:
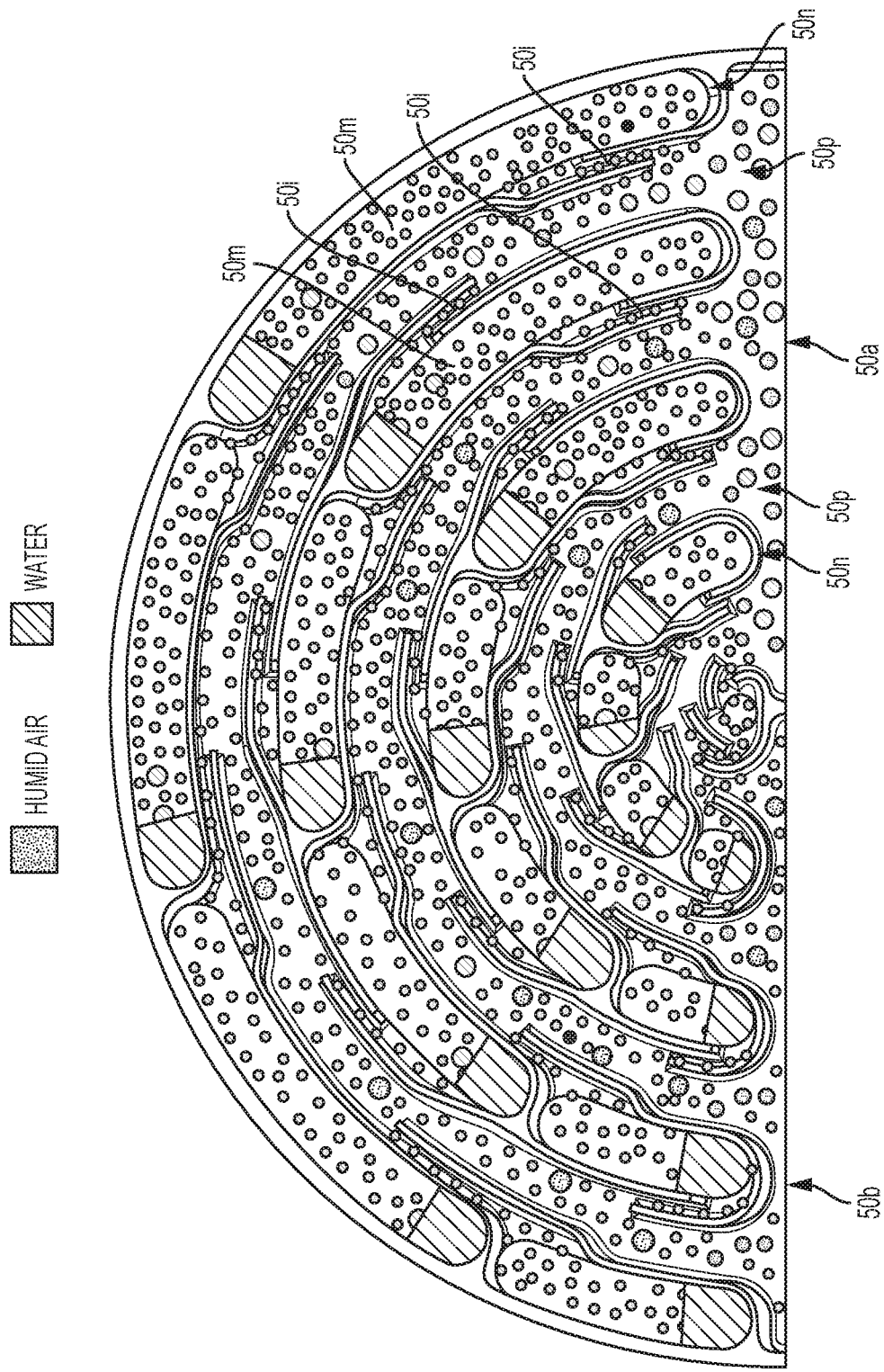
FIG. 5 is a schematic view of a water extractor, while depicting accumulation of humid air and water, according to an exemplary embodiment of the present invention.

FIG. 5 is an exemplary embodiment of a first water extractor 50 which is similar in design to the embodiment of FIGS. 4A-4C. FIG. 5 is intended to depict the location of humid air and water, though the invention is not intended to be limited by this characterization. A flow can enter the first water extractor 50 at an inlet face 50a and exit there from at an outlet face 50b. Upon the flow entering the water extractor 50, the flow can continue in one or more flow channels 50p of flow paths. In the flow channels, the humid air and water droplets are relatively randomly mixed.

One or more chamber inlets 50i enable and promote a portion of the flow to enter one or more chambers 50m of one or more chamber layers 50n. In a chamber 50m, humid air may accumulate within the chamber. Water may tend to accumulate at a downstream end of the chamber 50m. Between the two ends of the chamber 50m, a mixture of humid air and water droplets are relatively randomly mixed.

Though not depicted in FIG. 5, accumulated water in one or more of the chambers 50m may travel downward due to gravity. After traveling downward, the water may be received in a manifold and expelled, as shown in the embodiment of FIG. 3.

Figure 6A:
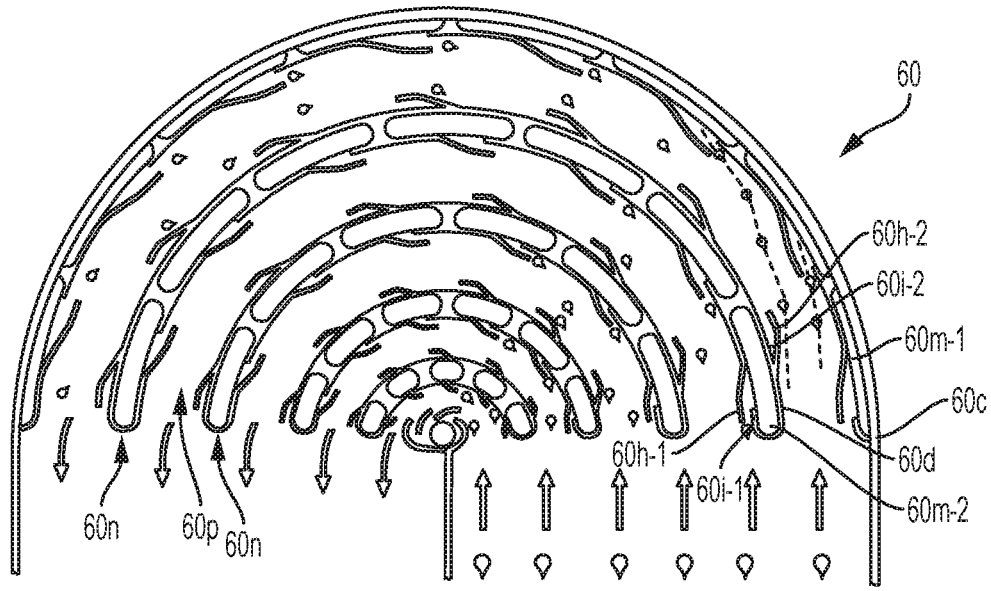
FIG. 6A is a schematic view of a water extractor according to yet another exemplary embodiment of the present invention.
Figure 6B:
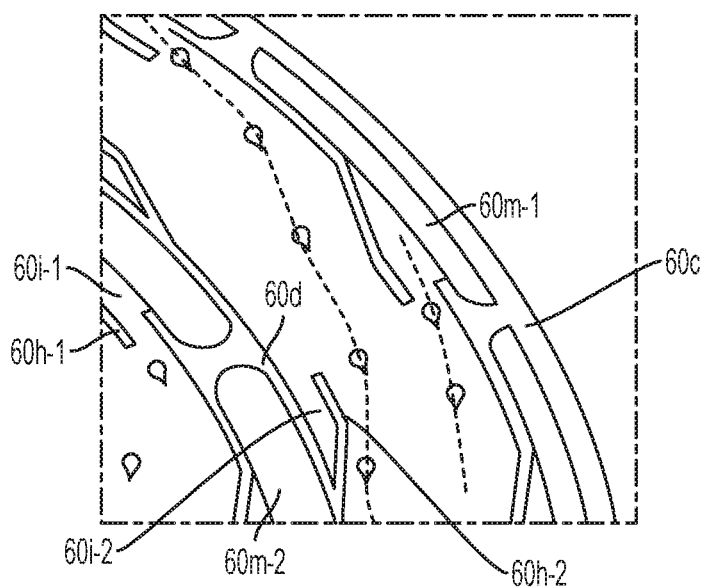
FIG. 6B is an enlarged view of a portion of FIG. 6A.

FIGS. 6A-6B depict another embodiment of a first water extractor 60 and which is similar in design to the embodiment of FIGS. 4A-4C. In the extractor 60, chambers 60m-1 are immediately adjacent an outside wall 60c. Other chambers 60m-2 are radially away from the outside wall 60c and adjacent to interior walls 60d. In this embodiment, the configurations of the chambers 60m-1 are different from the configurations of chambers 60m-2, at least to the extent of their widths.

Also, in this embodiment, one or more interior chambers 60m-2 may have a chamber inlet 60i-1 formed by a wall portion 60h-1, but only on one lateral side of the chamber 60m-2 so that humid air and water, from a flow channel, may flow into the chamber 60m-2 from only one lateral side. On an opposite lateral side of that chamber 60m-2, a wall portion or ramp 60h-2 may form an inlet or pocket 60i-2 but it may be closed to the chamber 60m-2 so that humid air and water may not flow into the chamber 60m-2 from that one side. Thus, in embodiments, along any one flow channel 60p that extends between two chamber layers 60n, open inlets 60i-1 may be located along one side of the flow channel, while closed inlets 60i-2 may be located along an opposite side the flow channel. That is in contrast to the embodiment of FIGS. 4A-4C wherein open chamber inlets are along both sides of a flow channel.

Figure 7:
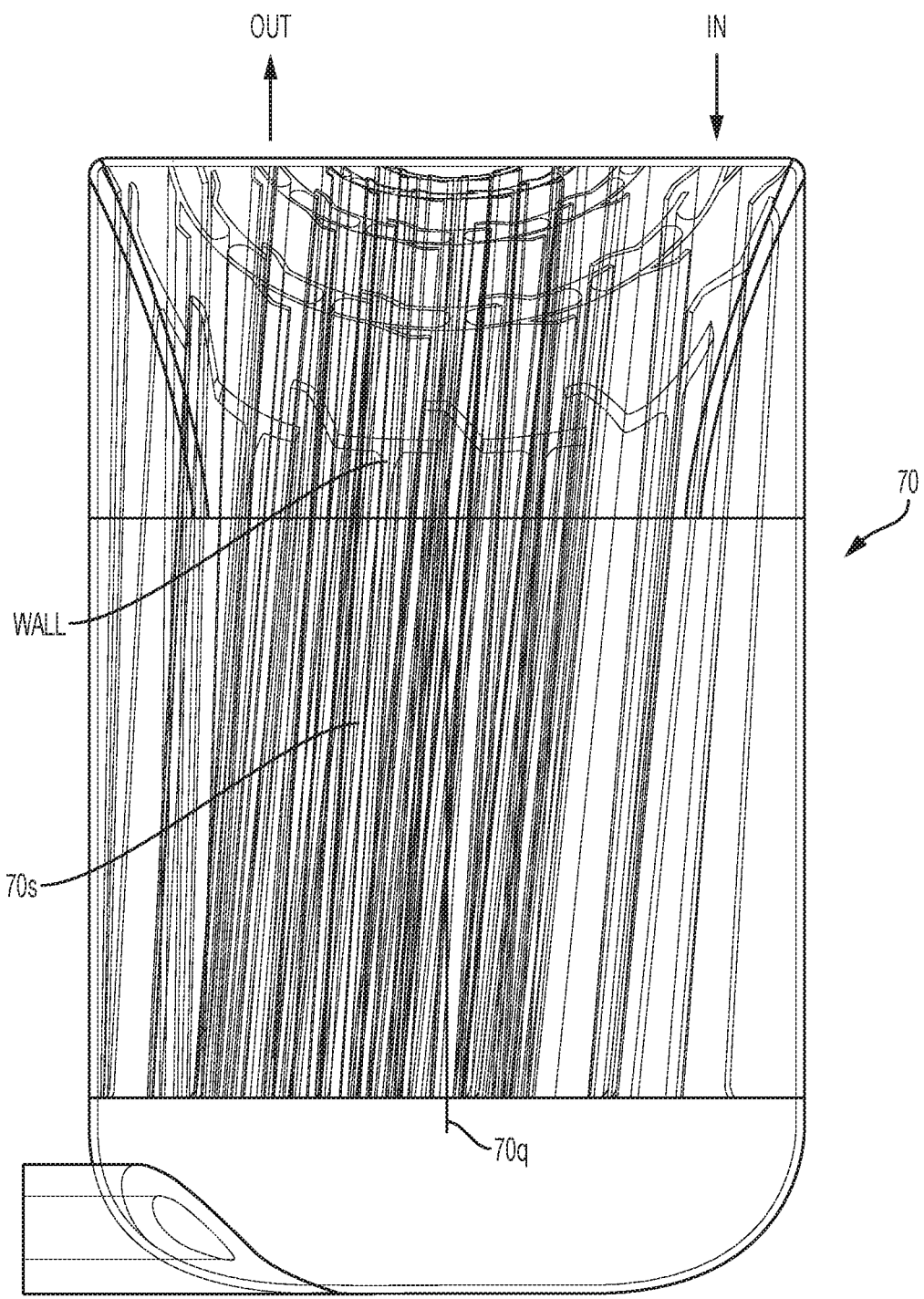
FIG. 7 is a schematic view of a water extractor according to an additional exemplary embodiment of the present invention.

FIG. 7 depicts another embodiment of a first water extractor 70 and which is similar in design to the embodiment of FIGS. 6A-6B. In the water extractor 70, however, one or more of the interior walls (and/or one or more chambers and/or chamber inlets) are twisted about a center axis 70q (i.e., twisted in a vertical direction) to form a type of helix configuration. Thereby, a vertical axis 70s along which the interior wall lies is no longer parallel to the center axis 70q or direction of gravity, such as in the embodiment of FIGS. 4A-4C. Instead, the vertical axis lies non-parallel to the center axis 70q or direction of gravity. This can enable and promote downward movement of collected water in the chambers and into the manifold for exit. In contrast, the other embodiments above rely primarily on gravity to move the collected water downwards.

In any of the embodiments herein, the number and configuration of chambers, inlets, flow channels and flow layers may be different.

Turning back to FIG. 2, dehumidified air 25 from the first water extractor 16 exits, via the dehumidified air outlet face 16b, and flows back into the condenser 15 that is directly downstream of the first water extractor 16. The dehumidified air inlet face 15c of the condenser 15 directly interfaces (i.e., is directly face-to-face with) the dehumidified air outlet face 16b of the water extractor 16. Thereby, at such interface, no flow connection lines are needed between the first water extractor 16 and the condenser 15.

In the condenser 15, the dehumidified air may undergo heat exchange with the inlet air 12, and exit as outlet air 18, via an air outlet or manifold 23. The outlet air 18 may flow to a mixer, for example, of an ECS of an aircraft. The dehumidified air may exit the condenser 15 as condensed, dehumidified air, via the dehumidified air outlet face 15d.

A second water extractor 19 can be directly downstream of and directly interfacing the condenser 15. A condensed air inlet face 19a of the water extractor 19 may be directly face-to-face with the dehumidified air outlet face 15d of the condenser 15. Thereby, flow lines are eliminated between the water extractor 19 and the condenser 15.

The second water extractor 19 can be similar in design and function to the first water extractor 16. Upon receiving the dehumidified, condensed water and air from the condenser 15, the second water extractor 19 can turn the condensed water and air which, in this case, is towards the reheater 14. In this exemplary embodiment, the condensed air can be turned 90°, or substantially about 90°. Concurrently as the condensed water and air is turned, the water extractor 19 can remove water from the condensed water and air, via inertia.

From the second water extractor 19, further dehumidified condensed air may exit, via the dehumidified outlet face 19b, and enter the reheater 14, via the dehumidified air inlet face 14c. In the reheater 14, the further dehumidified condensed air may undergo heat exchange with the inlet air 17 and exit as the outlet air 13.

It should be understood, of course, that the foregoing relates to exemplary embodiments of the invention and that modifications may be made without departing from the spirit and scope of the invention as set forth in the following claims.

We claim:

1. A water extractor, comprising:
   a plurality of layers of chambers, the plurality of layers including:
   a first layer comprising a first chamber; and
   a second layer comprising a second chamber and a third chamber that is positioned downstream of the second chamber; and
   a plurality of flow channels, each flow channel of the plurality of flow channels being configured to promote a higher pressure fluid flow relative to the first chamber or the second chamber,
   wherein at least one flow channel of the plurality of flow channels is interposed between the first layer and the second layer in a radial direction,
   wherein the plurality of layers of chambers and the plurality of flow channels are configured to enable a fluid flow to enter into the first chamber, the second chamber, and the third chamber via a plurality of chamber inlets.

2. The water extractor of claim 1, wherein the plurality of layers of chambers have twisted configurations.

3. The water extractor of claim 1, wherein the plurality of flow channels comprise high pressure zones having twisted configurations.

4. The water extractor of claim 1, wherein:
   the second layer comprises a plurality of interior walls configured to provide the third chamber in an end-to-end relationship with the second chamber.

5. The water extractor of claim 1, further including at least one other inlet,
   wherein the at least one other inlet is configured to form a ramp that extends into and in the same direction as the higher pressure fluid flow.

6. The water extractor of claim 1, wherein the first chamber of the first layer is upstream of the third chamber of the second layer.

7. The water extractor of claim 6, wherein the first chamber is upstream of the second chamber of the second layer.

8. The water extractor of claim 1, wherein the second chamber includes a second chamber inlet of the plurality of chamber inlets, and wherein the second layer includes a first lateral side and a second lateral side, wherein the second chamber inlet promotes fluid to enter from the first lateral side of the second layer and into the second chamber.

9. The water extractor of claim 8, wherein the third chamber includes a third inlet on the first lateral side of the second layer.

10. The water extractor of claim 1, wherein the plurality of chamber inlets includes first and second chamber inlets configured to enable the fluid flow to enter the second chamber.

11. The water extractor of claim 10, wherein the first chamber inlet is disposed on a first side of the second layer and the second chamber inlet is disposed on a second side of the second layer, the second side being radially outwards of the first side.

12. A heat exchanger system, comprising:
    a reheater;
    a condenser downstream of the reheater;
    a first water extractor that is downstream of and directly interfaces the condenser, the first water extractor including the water extractor in claim 1; and
    a second water extractor that is downstream of and directly interfaces the condenser, wherein the second water extractor is upstream of the reheater.

13. The heat exchanger system of claim 12, wherein the reheater and the condenser are part of a common core of cross flow passages.

14. The heat exchanger system of claim 12, wherein the condenser shares a heat exchange passage with the reheater.

15. The heat exchanger system of claim 12, wherein the condenser includes a first pass directly downstream of the reheater.

16. A water extractor, comprising:
    a plurality of layers of chamber inlets, the plurality of layers including:
    a first layer comprising a first chamber inlet; and
    a second layer comprising a second chamber inlet and a third chamber inlet, wherein the third chamber inlet extends in a direction towards the second chamber inlet; and
    a plurality of channels of flow paths,
    wherein at least one channel of the plurality of channels is interposed between the first layer and the second layer in a radial direction,
    wherein the first chamber inlet is configured to promote a first fluid flow to enter into a first chamber,
    wherein the second chamber inlet is configured to promote a second fluid flow to enter into a second chamber, and wherein the third chamber inlet is configured to promote the second fluid flow to enter a third chamber.

17. The water extractor of claim 16, wherein:
the plurality of layers comprise low pressure zones; and
the plurality of channels comprise high pressure zones, wherein the high pressure zones and the low pressure zones are configured to provide a pressure differential between at least the first flow path and the first chamber.

18. The water extractor of claim 16, further comprising:
a plurality of interior walls; and
wherein the interior walls are twisted about a center of the extractor.

19. The water extractor of claim 16, wherein the plurality of layers include the first, second, and third chambers, wherein the second chamber includes a downstream end, and wherein the downstream end of the second chamber is upstream of the third chamber.

20. The water extractor of claim 16, wherein the second layer further comprises a fourth chamber inlet configured to enable the second fluid flow to enter the second chamber, wherein the second chamber inlet is radially inwards of the fourth chamber inlet.

* * * * *